United States Patent
Mimura et al.

(10) Patent No.: US 6,682,046 B2
(45) Date of Patent: Jan. 27, 2004

(54) FUEL INJECTION VALVE

(75) Inventors: Eiji Mimura, Okazaki (JP); Masaaki Konishi, Chiryu (JP); Hideo Kiuchi, Hoi-gun (JP)

(73) Assignee: Denso Corporation, Kariya (JP)

( * ) Notice: Subject to any disclaimer, the term of this patent is extended or adjusted under 35 U.S.C. 154(b) by 99 days.

(21) Appl. No.: 10/133,425

(22) Filed: Apr. 29, 2002

(65) Prior Publication Data

US 2002/0158220 A1 Oct. 31, 2002

(30) Foreign Application Priority Data

Apr. 27, 2001 (JP) ........................................ 2001-133279

(51) Int. Cl.[7] .......................... F02M 51/06; F16K 31/02
(52) U.S. Cl. ................. 251/129.15; 251/129.14
(58) Field of Search ...................... 251/129.01–129.22

(56) References Cited

U.S. PATENT DOCUMENTS

| | | | |
|---|---|---|---|
| 4,946,107 A | * 8/1990 | Hunt | 251/129.1 |
| 5,040,731 A | * 8/1991 | Yokoyama et al. | 251/129.15 |
| 5,540,388 A | * 7/1996 | Sasao | 239/417.3 |
| 5,769,391 A | 6/1998 | Noller et al. | |
| 6,224,348 B1 | * 5/2001 | Fukanuma et al. | 251/129.13 |
| 6,336,621 B1 | * 1/2002 | Ii et al. | 251/129.15 |

* cited by examiner

*Primary Examiner*—Paul J. Hirsch
(74) *Attorney, Agent, or Firm*—Nixon & Vanderhye P.C.

(57) ABSTRACT

A fuel injection valve includes, in part, a pipe, a fixed connector (fixed core), a movable core, a solenoid coil and a needle valve. In the fuel injection valve, a diameter of a fixed action surface of the fixed connector is made smaller than a movable action surface of the movable core. Therefore, magnetic flux around an outer circumferential portion is transmitted from the fixed action surface to the movable action surface substantially in a direction perpendicular to the movable action surface. Thus, an electromagnetic force acting therebetween is efficiently transformed to an attracting force for the movable core.

6 Claims, 2 Drawing Sheets

FUEL INJECTION VALVE

CROSS REFERENCE TO RELATED APPLICATION

This application is based upon, and claims the benefit of priority of, prior Japanese Patent Application 2001-133279, filed on Apr. 27, 2001, the contents of which are incorporated herein by reference.

BACKGROUND OF THE INVENTION

1. Field of the Invention

The present invention relates to a fuel injection valve operated by an electromagnetic force.

2. Description of Related Art

Recently, in general, fuel injection valves having high output, low noise, and the like are in demand. Furthermore, it is desired that the fuel injection valves consume low fuel amounts (i.e. are economical), and conform to strict exhaust-gas emission regulations as they apply to gasoline and diesel engines. Thereby, engine fuel supply may be accurately performed by a fuel injection valve.

In fuel injection valves, a fixed connector (fixed core) and a movable core connected to a valve body are contained in a cylindrical pipe. A solenoid coil is provided at an outer circumferential location relative to them, and the fixed connector and the movable core form a part of a magnetic circuit. When the solenoid coil is energized and generates a magneto motive force, a magnetic path is formed from the fixed connector to the movable core. Then, the movable core is attracted to the fixed connector by an electromagnetic force, and the valve body opens a fuel injection hole. When the energization for the solenoid coil is stopped, the movable core detaches (moves away) from the fixed connector by a spring (force applying member), and the valve body closes the fuel injection hole. The fuel injection valve is controlled by an engine control unit (ECU), and it is generally controlled by adjusting a voltage applied to the solenoid coil. An opening-closing time and opening-closing timing are controlled for the valve body, so that an injection amount of fuel and injection timing thereof, injected into an intake pipe (rail) and cylinders, are accurately controlled.

However, improving the response performance of the valve body for opening and closing the fuel injection hole is required to accurately control such a fuel injection system. Accurately controlling the fuel injection system is effective at improving the response performance which increases an attracting force that attracts the movable core. When an electromagnetic force is increased by increasing the number of turns of the solenoid coil or current supplied to the solenoid coil, the attracting force is increased. However, the fuel injection valve size or power consumption, usually, must also increase. Further, a design change may be required which leads to increased production costs.

The present invention has been made in view of the above problems. That is, an electromagnetic force, generated between the fixed connector and the movable core, can be efficiently used. It is an object of the present invention to provide a fuel injection valve which can improve response performance of a valve body, for example, by increasing an attracting force of the movable core.

In JP-W-H11-500509, the following fuel injection valve is disclosed. A movable core is inserted into a cylindrical pipe, and a fixed connector (fixed core), having a larger diameter than the movable core, faces, or is adjacent to, the movable core. In a conventional fuel injection valve, generally an outer diameter of the fixed connector is larger than that of the movable core as in the fuel injection valve disclosed in JP-W-H11-500509, or both are equal in size to each other. The reason is as follows. When magnetic flux is generated in a direction from an end surface (fixed action surface) of the fixed connector to an end surface (movable action surface) of the movable core, the greater an area of the fixed action surface, the larger the attracting force obtained.

The above problems have been studied and tests were conducted to reveal the following result which may be contrary to conventional common sense. That is, when the outer diameter of the fixed action surface is made smaller than that of the movable action surface, the attracting force generated therebetween is increased. So, the present invention has been made.

A fuel injection valve according to the present invention includes a cylindrical pipe, a fixed connector inserted into and fixed to the pipe, a movable core inserted into the pipe so as to slide in contact with an inner circumferential surface thereof, a solenoid coil energized by a power supply source, and a valve body being movable together with the movable core. The fixed connector has a fixed action surface at one end side and is made of a magnetic material. The movable core has a movable action surface facing the fixed action surface at one end and is made of a magnetic material. The solenoid coil generates magnetic flux transmitted from the fixed action surface to the movable action surface, and it generates an attracting force between the fixed connector and the movable core. The valve body opens and closes a fuel injection hole by energizing and de-energizing the solenoid coil. In the fuel injection valve, an outer diameter of the fixed action surface is smaller than that of the movable action surface.

In the fuel injection valve, when the magnetic flux is transmitted from the fixed action surface to the movable action surface and a magnetic circuit is formed from the fixed connector to the movable core, the following result occurs. That is, when the outer diameter of the fixed action surface is smaller than that of the movable action surface, the attracting force generated therebetween is increased.

In the fuel injection valve using this result, for example, the attracting force between the fixed connector and the movable core can be increased while a size of the solenoid coil or an applied voltage (current) is not increased. Thus, response performance of opening and closing the valve body can be improved. In the fuel injection valve according to the present invention, when the attracting force and the response performance is the same as in a conventional case, the size of the solenoid coil and associated power consumption can be reduced. The reason for this result can be considered in the following manner.

That is, as in a conventional fuel injection valve, when the outer diameter of the fixed action surface is larger than that of the movable action surface, the magnetic flux around an outer circumferential portion is transmitted from the fixed action surface to the movable action surface in a fashion or direction not substantially perpendicular to the movable action surface, but in a direction inclined to the movable action surface. Therefore, a vertical component (a component in a normal line direction of the action surfaces) of the electromagnetic force generated around the outer circumferential portion is reduced. This vertical component is transformed to the attracting force required to attract the movable core in an axial direction. Accordingly, when an angle at which the magnetic flux around the outer circumferential portion is transmitted to the movable action surface is altered from 90 degrees, an effectively transformed amount from the electromagnetic force to the attracting force is reduced, so that the attracting force is ultimately reduced.

In the fuel injection valve according to the present invention, since the outer diameter of the fixed action surface is smaller than that of the movable action surface, the magnetic flux can be readily transmitted from the fixed action surface to the movable action surface substantially in a direction or fashion perpendicular to the movable action surface. The electromagnetic force acting between the fixed action surface and the movable action surface can be effectively transformed to the attracting force for the movable core. Especially, magnetic flux density around the outer circumferential portion is large. Therefore, as the magnetic flux around the outer circumferential portion is transmitted to the movable action surface substantially in a direction perpendicular to the movable action surface, the attracting force increases.

Additionally, the magnetic flux around the outer circumferential portion is transmitted to the movable action surface substantially in a direction perpendicular to the movable action surface, thereby aligning the magnetic flux at the center portion. That is, the magnetic flux at the center portion can also be readily transmitted to the movable action surface in a substantially vertical direction (referencing FIG. 2). Thus, the electromagnetic force acting between the fixed action surface and the movable action surface can be further efficiently used as an effective attracting force for the movable core. Accordingly, the larger attracting force acts on the movable core than in a conventional case.

The response performance of the movable core, that is, of the valve body is improved by this increase in the attracting force. Therefore, a minimum injection amount can be suitably controlled, and the fuel injection valve can be more accurately controlled.

In the present invention, the important areas are not the outer diameters of the fixed connector and the movable core, but the outer diameters of the fixed action surface and the movable action surface which face each other. That is, the outer diameter of the fixed connector is not necessarily required to be smaller than that of the movable core. For example, the outer diameter of the fixed action surface can be made smaller than that of the movable action surface by de-burring an outer circumferential portion (end) of the fixed connector. Dents and burrs can be prevented from being generated on the fixed connector by performing the de-burring, and quality control can be also readily performed.

Here, when the outer diameter of the fixed action surface is made excessively smaller, an effective area where the electromagnetic force acts is reduced, and the attracting force may then also be reduced. Therefore, preferably, the outer diameter (d1) of the fixed action surface is made smaller than that (d2) of the movable action surface by 0.5–10% of the outer diameter of the movable action surface. That is, $(d2-d1)/d2 = 0.005-0.1$ When smaller than 0.5%, both outer diameters are substantially equal to each other. When larger than 10%, the attracting force is reduced. 2.5–3.5%, 2–5%, 1–7% are preferred in this order (e.g., 2.5–3.5% is more preferable than 2–5%). The fuel injection valve according to the present invention is substantially for a solenoid fuel injection valve. However, it is applicable to a gasoline engine or a diesel engine, and is for injecting fuel into a cylinder or an intake manifold.

Further areas of applicability of the present invention will become apparent from the detailed description provided hereinafter. It should be understood that the detailed description and specific examples, while indicating the preferred embodiment of the invention, are intended for to purposes of illustration only and are not intended to limit the scope of the invention.

BRIEF DESCRITPION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
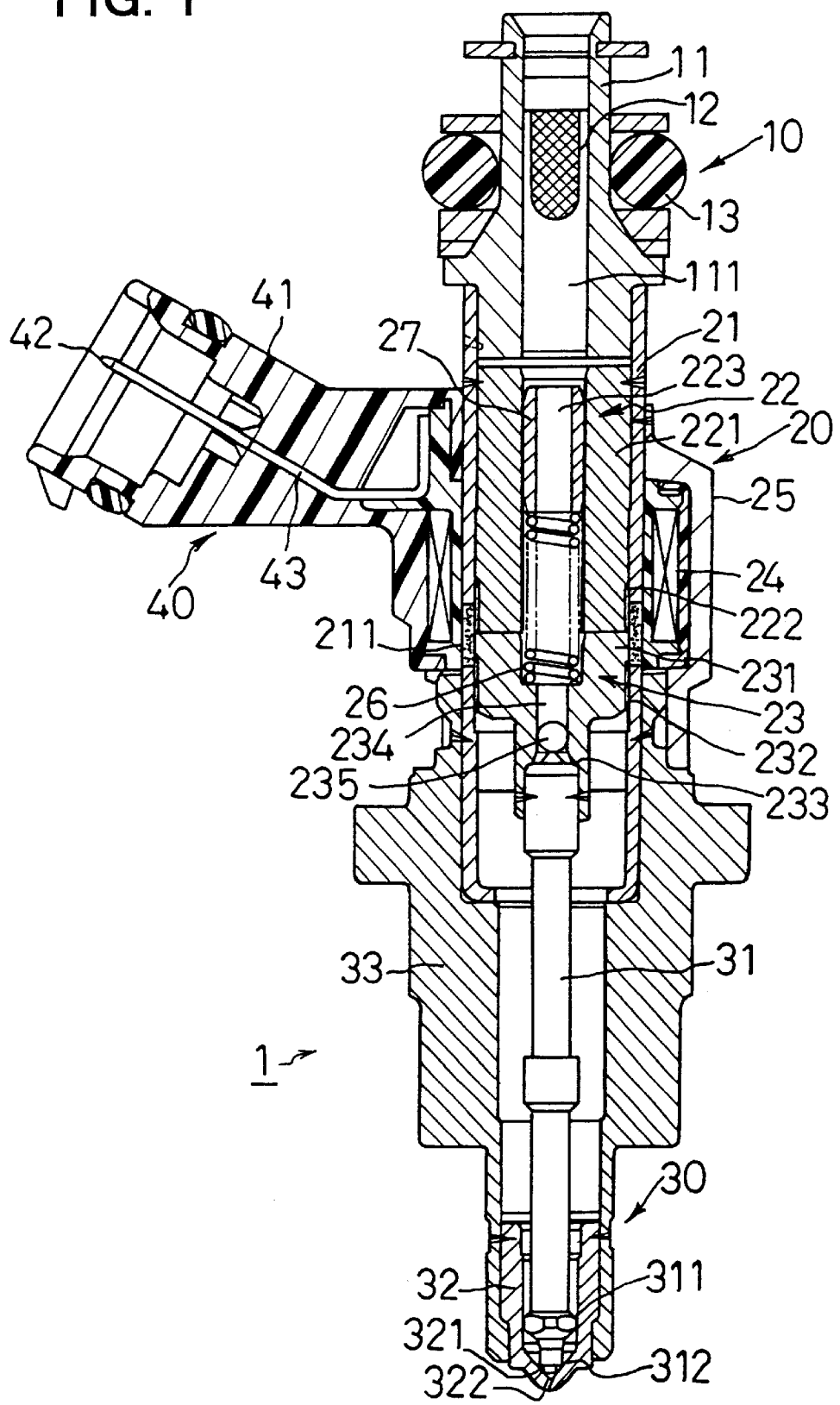
FIG. 1 is a cross-sectional view showing a fuel injection valve according to an embodiment of the present invention.

FIG. 1 shows a fuel injection valve 1 according to an embodiment of the present invention. The fuel injection valve 1 is disposed on a cylinder head of a vehicular gasoline engine. That is, the fuel injection valve 1 is a direct injection type and an electromagnetic type. The fuel injection valve 1 consists, in part, of a fuel supply portion 10, an electromagnetic driving portion 20, a valve portion 30 and an electric connector portion 40.

The fuel supply portion 10 is constructed of a fuel connector 11, a fuel filter 12 and an O-ring 13 attached to an outer circumferential portion of the fuel connector 11. The fuel connector 11 is connected to a common rail system (not shown) into which high-pressure fuel is supplied, and the fuel filter 12 is disposed in a fuel passage 111 provided in the fuel connector 11. The fuel connector 11 is connected to the common rail system through using the O-ring 13 in an oil-tight (sealed) fashion.

The electromagnetic driving portion 20 is constructed by a pipe 21, a fixed connector (fixed core) 22, a movable core 23, a solenoid coil 24, a magnetic plate 25, a spring 26 and adjuster 27. The pipe 21 has a cylindrical shape and includes a bottom plane portion defining an opening at its center. The fixed connector 22 having a stepped cylindrical shape is press-fitted into and fixed to the pipe 21, and the movable core 23, having a stepped cylindrical shape, faces the fixed connector 22. The solenoid coil 24 generates a magnetomotive force, and the magnetic plate 25 forms a magnetic circuit between the pipe 21 and the nozzle holder 33, to be described later. The spring 26 applies a force to the movable core 23 (downward in FIG. 1), and the adjuster 27 adjusts the applied force.

The fixed connector 22 is constructed of a press-fitted portion 221 to be press-fitted into the pipe 21 and a diameter reduction portion 222 whose diameter is reduced. The diameter reduction portion 222 extends downward in the drawing coaxially with the press-fitted portion 221. The press-fitted portion 221 of the fixed connector 22 is press-fitted into the pipe 21, and it is fixed (sealed) thereto in an oil-tight fashion by welding. The fixed connector 22 defines a fuel passage 223 that communicates with the fuel passage 111 along its center axis. The spring 26 and the adjuster 27, each having a cylindrical shape, are disposed in the fuel passage 223.

The movable core 23 is constructed of a guide portion 231, a diameter reduction portion 232 (extending downward in FIG. 1) that is coaxial with the guide portion 231, and a supporting portion 233 protruding from the diameter reduction portion 232 (downward in FIG. 1). The guide portion 231, inserted into the pipe 21, slides in contact with an inner circumferential surface of the pipe 21. The cylindrical-shaped supporting portion 233 defines a downward opening in FIG. 1. A head portion of the needle valve 31 is press-fitted into the opening of the supporting portion 233 at its lower side, and it is fixed to the supporting portion 233 by welding or the like. The movable core 23 defines a fuel passage 234 along its center axis, and a seat surface for the spring 26 is provided in the fuel passage 234 at an upper side in the drawing. The fuel passage 234 communicates with a through hole 235 defined in the supporting portion 233 by boring the supporting portion 233.

The above-described fuel connector 11 is inserted into the opening portion of the pipe 21 at the upper side in FIG. 1, and it is fixed (sealed) to the pipe 21 by welding. The pipe 21, the fixed connector 22, the movable core 23, the magnetic plate 25 and the nozzle holder 33 are made of an iron-group magnetic material. Here, non-magnetic portion 211, non-magnetized by high-frequency thermal processing, is provided in the pipe 21 around its center (around a boundary between the fixed connector 22 and the movable core 23). The non-magnetic portion 211 is used for preventing the magnetic circuit from being short-circuited.

The valve portion 30 is constructed of the needle valve 31 as a valve body, a nozzle 32 having a cylindrical shape and the nozzle holder 33 for fixing and holding the nozzle 32. The nozzle 32 defines a fuel injection hole 321 by boring the nozzle 32 at its top end portion. The needle valve 31 reciprocates while its guide portion 311 slides in contact with an inner circumferential surface of the nozzle 32. A tapered end surface of the needle valve 31 is seated on and lifted from a tapered seat surface 312 of the fuel injection hole 321 during reciprocating movement of the needle valve 31, thereby opening and closing the fuel injection hole 321. The nozzle 32 defines plural injection holes 322 at a top end portion of the fuel injection hole 321. Fuel is injected from the injection holes 322 into a cylinder (not shown).

The electric connector portion 40 is a molded resin member fitted to the pipe 21 and the nozzle holder 33. The electric connector portion 40 is constructed by a connector 41 extending from the pipe 21 at a lateral side, a terminal 42 protruding from the connector 41 at an inner side and a conductor line 43 for connecting the terminal 42 and the solenoid coil 24. The conductor line 43 is embedded in the connector 41.

When a voltage is applied to the terminal 42 from an electronic control unit (ECU) as a power supply, a current flows into the solenoid coil 24. Then, the solenoid coil 24 is magnetized and generates a magneto-motive force in accordance with its current amount. Thus, magnetic flux is transmitted into a magnetic circuit formed from the fixed connector 22 to the fixed connector 22 through the movable core 23, the pipe 21, the nozzle holder 33, the magnetic plate 25 and the pipe 21 in this order.

Estimation for Diameter Reduction:

The fixed connector 22 and the movable core 23 are modeled based on their above-described shapes, and a transmittance state of magnetic flux is simulated therebetween. The simulation result is shown using magnetic flux vectors as in FIG. 2.

In this simulation, an outer diameter (outer diameter of the fixed action surface) of the diameter reduction portion 222 of the fixed connector 22 is defined by 6.0 mm, and an outer diameter (outer diameter of the movable action surface) of the guide portion 231 of the movable core 23 is defined by 6.2 mm.

Figure 3:
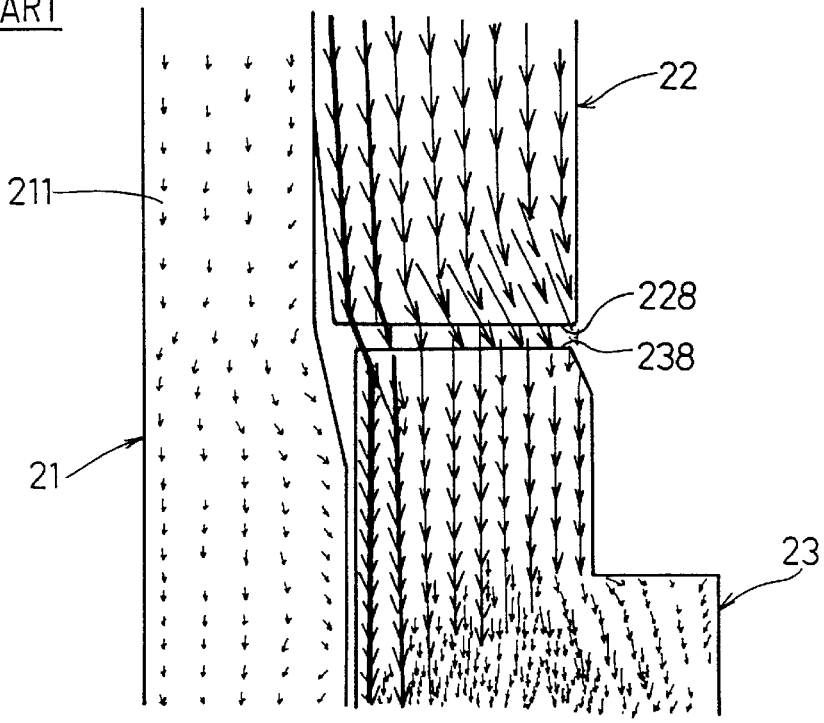
FIG. 3 is a schematic view showing a simulation result of magnetic flux generated between a modeled fixed connector and a modeled movable core in a conventional example.

On the other hand, for comparison with the above simulation, the outer diameter of the fixed action surface is defined by 6.4 mm, and the outer diameter of the movable action surface is defined by 6.2 mm. This simulation result is shown in FIG. 3. Thick magnetic flux vectors around an outer circumferential portion of the fixed and movable cores 22, 23 indicate large magnetic-flux density.

Figure 2:
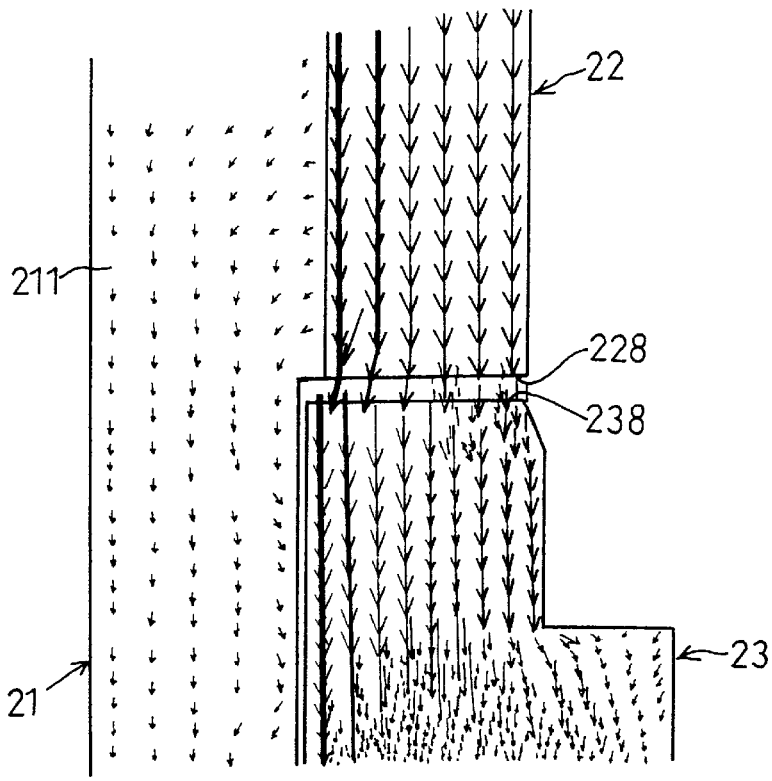
FIG. 2 is a schematic view showing a simulation result of magnetic flux generated between a modeled fixed connector (fixed core) and a modeled movable core (movable core) according to an embodiment of the present invention.

As seen from a comparison between FIGS. 2 and 3, when the outer diameter of the fixed action surface is smaller than that of the movable action surface (by about 3% of the outer diameter of the movable action surface) as in the present embodiment, the magnetic flux vectors are as follows. That is, generally, the magnetic vectors are arranged from the fixed action surface to the movable action surface substantially in the normal line direction (a straight line) of the fixed action surface. When the outer diameter of the fixed action surface is larger than that of the movable action surface, the magnetic flux vectors at the outer circumferential portion are generally inclined (bent) toward the inner portion of the pipe 21. Also, it is seen that a component of the magnetic flux vectors arranged in their normally aligned direction is reduced (FIG. 3). That is, when the outer diameter of the fixed action surface 228 is suitably smaller than that of the movable action surface 238 as in the present embodiment (FIG. 2), an electromagnetic force acting on the movable core 23 is efficiently transformed to an effective attracting force for the movable core 23.

In the fuel injection valve according to the present invention, an electromagnetic force acting on the movable core from the fixed connector is efficiently transformed to an attracting force for the movable core, and the attracting force can be increased. Additionally, since the outer diameter of the fixed action surface is only made smaller than that of the movable action surface (FIG. 2), a large design change is not required, and the present invention can be readily accomplished.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel injection valve comprising:
    a cylindrical pipe;
    a fixed connector inserted into and fixed to the pipe, the fixed connector having a fixed action surface at one end side and being made of a magnetic material;
    a movable core inserted into the pipe so as to slide in contact with an inner circumferential surface of the pipe, the movable core having a movable action surface facing the fixed action surface at one end and being made of a magnetic material;
    a solenoid coil energized by a power supply source, for generating magnetic flux transmitted from the fixed action surface to the movable action surface, and for generating an attracting force between the fixed connector and the movable core; and a valve body being movable together with the movable core, for opening and closing a fuel injection hole by energizing and de-energizing the solenoid coil, wherein an outer diameter of the fixed action surface is smaller than an outer diameter of the movable action surface.

2. The fuel injection valve according to claim 1, wherein the outer diameter of the fixed action surface is made smaller than that of the movable action surface by 0.5–10% of the outer diameter of the movable action surface.

3. The fuel injection valve according to claim 1, wherein the outer diameter of the movable action core has a beveled portion.

4. The fuel injection valve according to claim 1, wherein the outer diameter of the movable action core has a beveled portion that does not have an opposing surface on the fixed action surface.

5. The fuel injection valve according to claim 1, wherein a portion of the movable action surface is parallel to and directly opposes the fixed action surface.

6. The fuel injection valve according to claim 1, wherein a surface of the movable core perpendicular to the movable action surface is recessed within a non-magnetic portion of the pipe.

* * * * *